May 12, 1931.  W. KUHN  1,804,786
TELEPHONE TESTING SYSTEM
Filed April 5, 1930    4 Sheets-Sheet 1

Fig. 1.

INVENTOR
W. KUHN
BY P. C. Smith
ATTORNEY

May 12, 1931.  W. KUHN  1,804,786
TELEPHONE TESTING SYSTEM
Filed April 5, 1930    4 Sheets-Sheet 2

FIG. 2.

INVENTOR
W. KUHN
BY P. C. Smith
ATTORNEY

May 12, 1931. W. KUHN 1,804,786
TELEPHONE TESTING SYSTEM
Filed April 5, 1930  4 Sheets-Sheet 4

INVENTOR
W. KUHN
BY P. C. Smith
ATTORNEY

Patented May 12, 1931

1,804,786

UNITED STATES PATENT OFFICE

WALTER KUHN, OF STATEN ISLAND, NEW YORK, ASSIGNOR TO BELL TELEPHONE LABORATORIES, INCORPORATED, OF NEW YORK, N. Y., A CORPORATION OF NEW YORK

TELEPHONE TESTING SYSTEM

Application filed April 5, 1930. Serial No. 441,782.

This invention relates to a system for testing the operating time of electromagnets.

The object of this invention is to provide a testing system for electromagnets arranged to respond only to operations of said electromagnet of particular duration.

One embodiment of the present invention comprises a primary device for testing link circuit electromagnets or relays which is operable in conjunction with a secondary device for variably operating said relays. In the primary testing device a tuned relay is used which only responds to a particularly long operation of a link circuit supervisory relay thus preventing the recording of preliminary operations of said supervisory relay. Ordinarily a switch is rotated into a particular position for preparing a testing circuit to make particular tests. In the present system the testing device and link circuit are interconnected and during preliminary tests made by the secondary device the primary device remains inactive awaiting the foregoing long operation of the supervisory relay. In response to the operation of the foregoing tuned relay the primary device is prepared for testing operations of the supervisory relay of proper duration to illuminate a supervisory lamp. Impulses of a particular duration are then transmitted by the secondary device for operating the supervisory relay. A second tuned relay in the primary device responds to the later operations of the supervisory relay if they are of the proper duration. If the supervisory relay is not correctly adjusted an improper open or closed period of its contact is recognized by the primary testing device. When the supervisory relay properly responds to the impulses transmitted thereto by the secondary testing device the second tuned relay responds accordingly and a series of counting relays is operated to count a plurality of such operations. A signal is lighted by the correct operation of the primary testing device to indicate a satisfactorily adjusted supervisory relay.

The invention will be more clearly understood by consideration of the following description in connection with the drawings in which Fig. 4 shows a primary test line and Fig. 5 shows the manner in which Figs. 1 to 4 are to be arranged.

Figure 1:
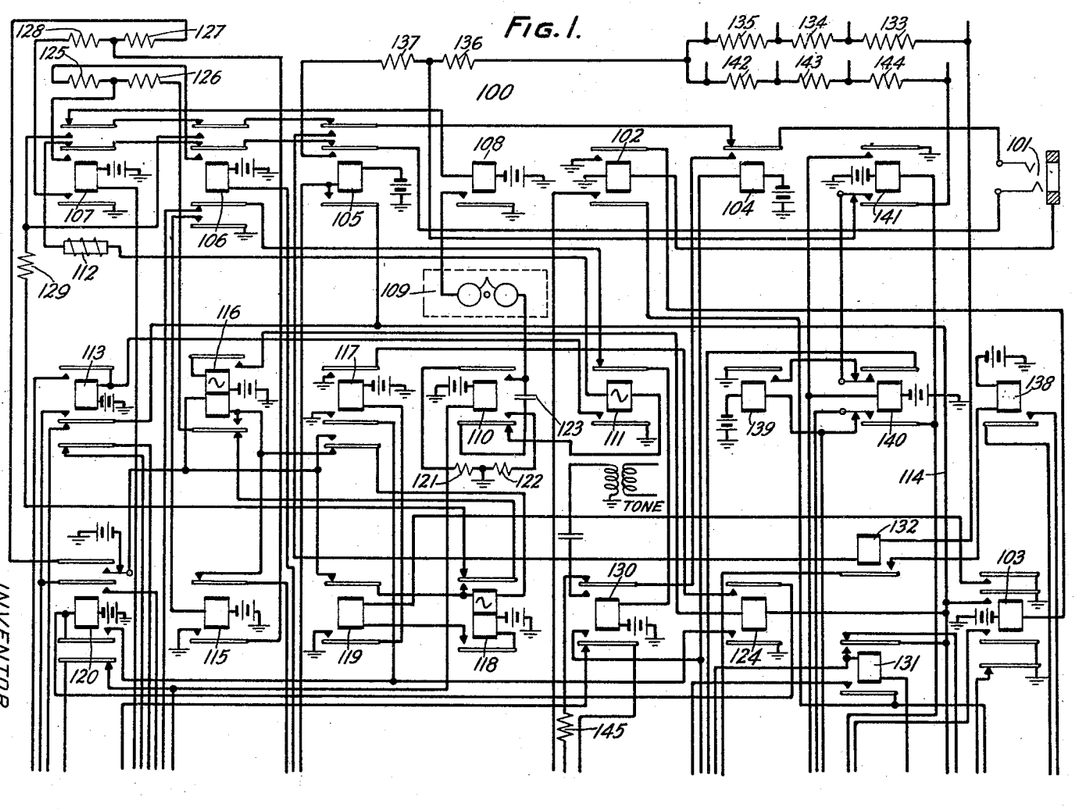
Figs. 1 and 2 show a secondary test line.
Figure 2:
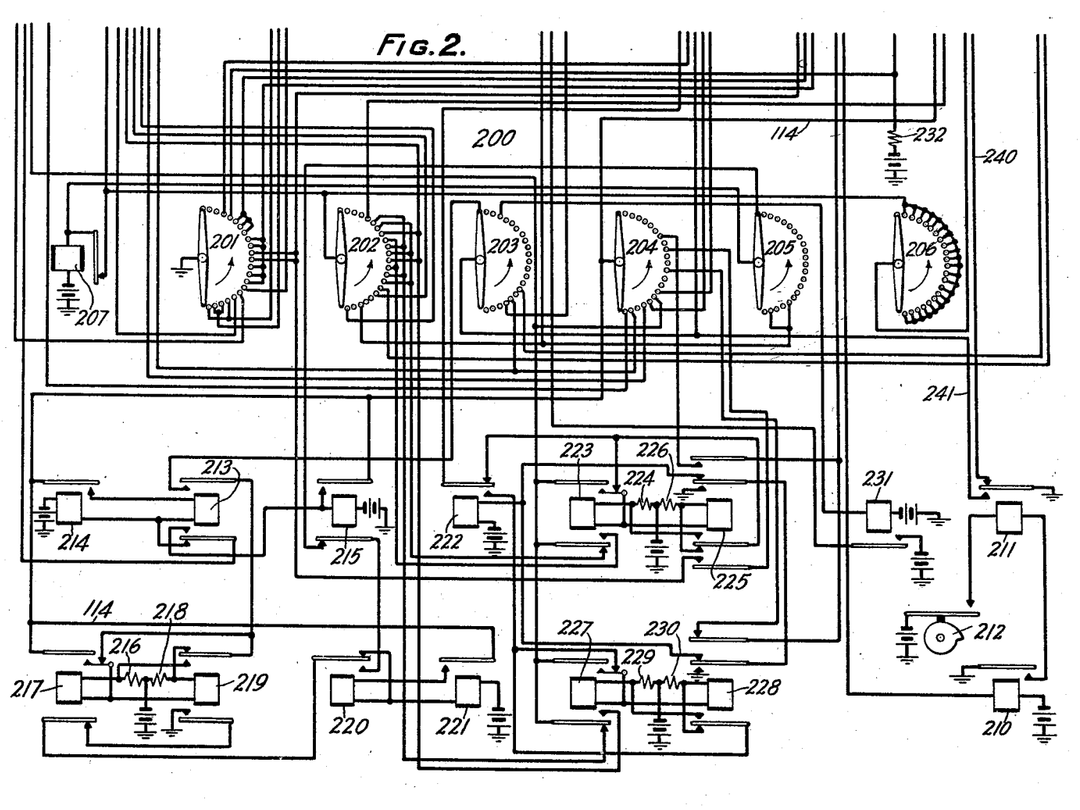

The secondary test line of Figs. 1 and 2 is a modification of the test line disclosed in Patent 1,688,993 granted to E. B. Smith October 23, 1928. The rotary step-by-step switch 200 serves to control the application of the various tests which include the determination that ringing current is being applied from the one ring commutator; tests of the adjustment of the trip relay 310 of the trunk both with a minimum non-operate resistance and a maximum operate resistance and tests of the supervisory relay 315 in which the relay is submitted to soaking current, current which will just operate it and current which is just insufficient to operate it. These circuits for the supervisory relay are closed for definite periods under the control of the interrupter 212.

Figures 4, 5:
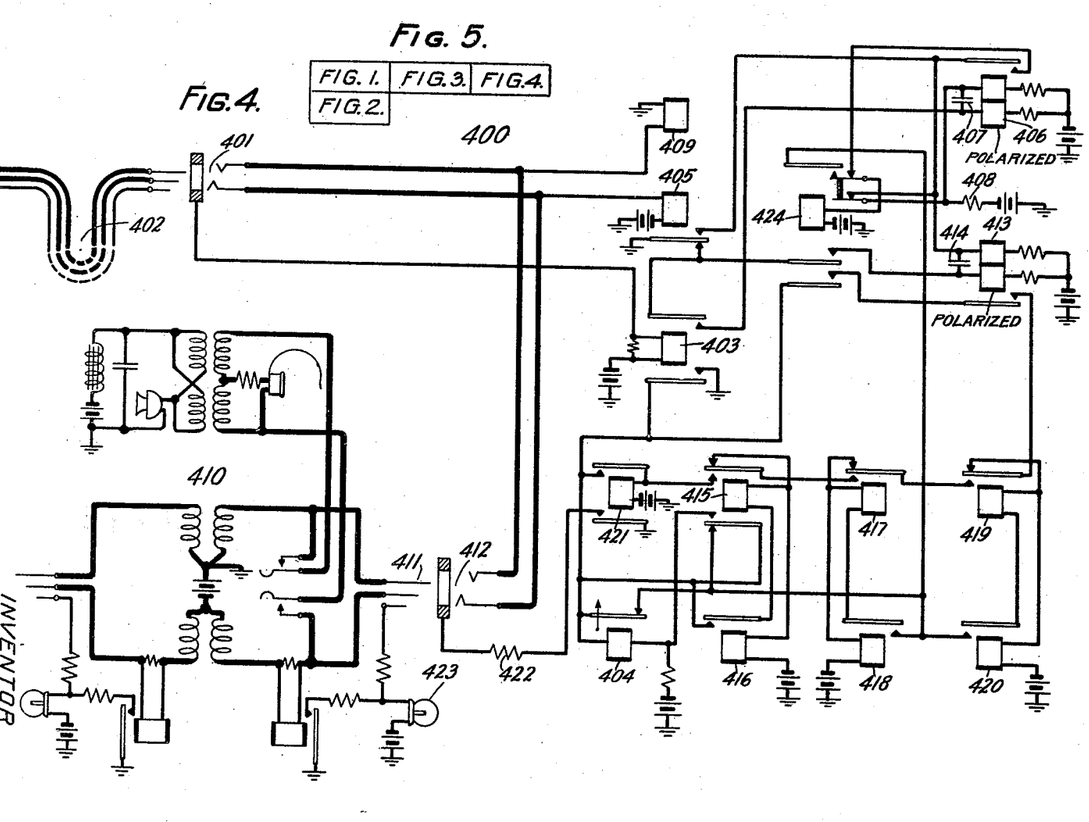

The primary test line shown in Fig. 4 comprises two tuned relay arrangements one including polarized relay 406 and condenser 407 and the other including relay 413 and condenser 414. The circuit including relay 406 is tuned to a comparatively long period while that including relay 413 is tuned to a shorter period. The longer period of relay 406 is used as a gateway to relay 413 and renders the test line independent of short preliminary operations of the supervisory relay.

Figure 3:
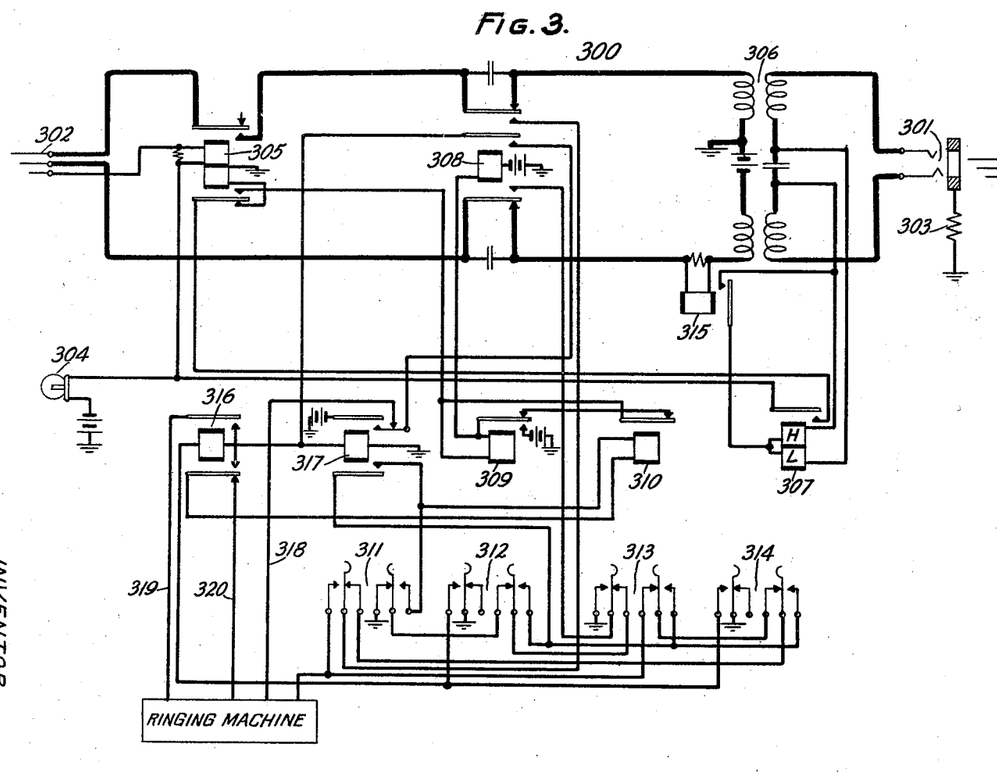
Fig. 3 shows a trunk circuit to be tested.

Assuming that the trunk of Fig. 3 is the one to be tested, the tester will communicate with the operator at whose position the trunk appears, ascertain whether the trunk is idle and if so will give to the operator the number of the secondary test line of Figs. 1 and 2. He will then connect the primary test line with the jack 301 of the trunk by means of patching cord 402 and associate his headset with the test line by inserting plug 411 of cord circuit 410 in jack 412 individual to the test line and by operating the listening key. The operator inserts plug 302 of the trunk circuit in jack 101 of the secondary test line and operates ringing key 311 as determined by the test line number.

When the patching cord 402 is connected between jack 301 of the trunk circuit and jack 401 of the primary test line, a circuit is closed from ground through resistance 303, sleeves of jack 301, patching cord 402 and jack 401, winding of relay 403 to battery. Relay 403 operates, supplying ground for the operation of the test line and closing a circuit for relay 404 which has no active function at the present time. Relay 403 also closes a circuit from ground over the back contact of relay 405, upper contact of relay 403, lower winding of relay 406 and battery. Relay 406 is polarized and is not energized in a direction to cause its contact to close at this time. This ground is also connected to one terminal of condenser 407 causing that condenser to be charged from battery through resistance 408. A circuit is also established from battery through relay 405, rings of jack 401, cord 402 and jack 301, lower right winding of repeating coil 306, high resistance and low resistance windings of relay 307, upper right winding of repeating coil 306, tips of jack 301, cord 402 and jack 401 to ground through coil 409. Relay 307 operates but relay 405 does not operate at this time, due to the high resistance winding of relay 307 and the primary test line remains in this condition until the completion of the preliminary tests by test circuit 100.

The insertion of plug 302 in jack 101 closes a circuit from ground through the winding of relay 102, sleeves of jack 101 and plug 302, upper winding of relay 305, lamp 304 to battery. Lamp 304 is lighted in this circuit and relays 102 and 305 operate. The operation of relay 305 prepares the circuit for causing application of ringing current to the test circuit. This circuit may be traced from battery through the winding of relay 308, back contacts of relays 309 and 310, in shunt of the winding of relay 309, front contact of relay 305, front contact of relay 307, to ground over the sleeve of plug 302. Relay 308 in operating completes the ringing circuit prepared by the operation of key 311. This circuit extends from ground at the ringing machine, left contact of key 311, front contact of relay 308, front contact of relay 305, to the tip of plug 302 and from the one-ring commutator of the ringing machine, back contact of relay 316, winding of relay 310, right contact of key 311, normal contact of keys 313 and 312, lower front contact of relay 308, to the ring of plug 302.

The operation of relay 102 closes an obvious circuit for relay 103 which in turn supplies ground to conductor 114 for locking and operating various relays as will be shown hereinafter. Relay 103 also closes a circuit for relay 210 which connects relay 211 to interrupter 212. The contact of relay 211 supplies interrupted ground to conductors 240 and 241 for purposes which will appear later. When relay 308 operates two circuits are completed, one of which may be traced in the test line, from the tip of jack 101 over the back contact of relay 104, outer back contacts of relays 105, 106 and 107 through the winding of relay 108 to battery. Relay 108 operates from the ground at the ringing machine and connects ground to the substation ringer 109. The second circuit previously traced from the ringing machine to the ring of plug 302 extends over the ring of jack 101, inner upper back contacts of relays 105, 106 and 107, retard coil 112, winding of relay 111, back contact of relay 110, condenser 123, ringer 109 to ground at the contact of relay 108. The first application of ringing current by the ringing machine will therefore cause the ringer to sound and relay 111 to operate. Relay 111 at its lower contact closes the circuit of relay 113 which in turn closes a circuit from grounded conductor 114 over the lower front contact of relay 113, back contact of relay 213, winding of relay 214 to battery. Relay 214 closes a locking circuit for itself through the winding of relay 213 to grounded conductor 114, but relay 213 does not operate until the end of the ringing period at which time the release of relays 111 and 113 removes the shunt from around the winding of relay 213.

When relay 213 is operated, a timing circuit is closed from conductor 241, brush 203 of switch 200 in its normal position, upper front contact of relay 213, normal contact and winding of relay 217, resistance 216 and battery. When conductor 241 is grounded responsive to the closure of interrupter 212, this circuit is completed and relay 217 locks to conductor 114, at the same time closing a circuit for relay 219 to conductor 114. When ground is disconnected from conductor 241, relay 219 operates. The next closure of the front contact of relay 211 which takes place a half second later completes the circuit above traced to the front contact of relay 213, and thence over the front contact of relay 219 to resistance 216 and battery in shunt of the winding of relay 217 which now releases. When relay 217 is released relay 219 is held operated over the normal contact of relay 217 to the contact of relay 211. With relay 219 operated and relay 217 released a circuit is closed from ground over the front contact of relay 219, back contact of relay 217, back contact of relay 220, winding of relay 221 to battery. Relay 221 locks through the winding of relay 220 to grounded conductor 114. When relay 211 opens its front contact relay 219 also releases, opening the shunt around relay 220 which now operates. Two additional closures of the front contact of relay 211 cause relays 217 and 219 to pass through a similar cycle of operations. At the time when relay 219 is again held operated and relay 217 released, the circuit previously traced is extended over the front contact of relay 220 to the armature of relay 215.

The purpose of this timing operation is to determine that the proper ringing key has been operated and that only one ring is being transmitted. If either key 313 or key 314 had been operated ringing current would have been connected to the tip conductor and ground to the ring conductor. This ringing current would have been ineffective since relay 108 is unresponsive to ringing current and condenser 123 is included in the circuit of relay 111. If key 312 had been operated the two ring commutator would have been employed which closes ringing current to conductor 319 for one second, disconnects it for one second, reconnects it for one second, and then holds it disconnected for three seconds. In order to start ringing at the beginning of the first ring the operation of relay 308 in response to the joint operation of relays 305 and 307 is not immediately effective to apply ringing current when two rings are to be transmitted. A commutator known as the pickup commutator connects battery to conductor 318 during a part of the three second interval in which ringing current is disconnected. A circuit is thereby closed over conductor 318, normal contact of relay 308, to the winding of relay 317 and ground. Relay 317 locks over its upper alternate contact. The closure of battery to conductor 318 also completes a circuit through the winding of relay 316 to ground at key 312. With relays 316 and 317 operated a circuit is prepared for the application of ringing current from conductor 319 over the front contacts of relay 316, winding of relay 310, lower contact of relay 317, contact of key 312, normal contact of key 313, front contact of relay 308 to the ring conductor. The application of ringing current at the beginning of the first ring is insured in this manner. As indicated above, interrupter 212 has a period of one half second so that the four operations of relay 211 measure an interval of two seconds which is greater than the interval between the two rings. If the wrong keys has been operated and a second pulse of ringing current is received before the circuit above traced is closed to the armature of relay 215, relays 111 and 113 will again operate and relay 113 will extend ground from conductor 114 over its lower front contact, lower front contact of relay 213 to winding of relay 215 and battery, relay 215 locks to conductor 114 and renders the circuit traced to its armature ineffective.

With the one ring commutator in use, ringing current is connected to conductor 320 and therefore to the ring conductor for two seconds and disconnected for four seconds. Therefore if the correct key has been operated a second pulse of ringing current will not be received before relay 217 releases, and the circuit controlled by relay 217 will be extended over the back contact of relay 215, normal contact of brush 205 to the winding of magnet 207 which controls test switch 200. When relay 211 opens its contact releasing relay 219, the circuit of magnet 207 is opened and the switch steps to its first position.

With switch 200 in position 1, a circuit is closed from battery through the winding of relay 110, lower contact of relay 120, brush 204 to grounded conductor 114. Relay 110 disconnects relay 111 from the ring conductor and connects ground through resistances 121 and 122 to the terminals of condenser 123 discharging that condenser to prevent false operation of relay 111 from condenser discharge. A circuit is also closed from ground over brush 201, back contact of relay 115, lower winding of relay 116 to battery at the normal contact of relay 120. This circuit also extends in parallel over the back contact of relay 117, upper winding of relay 118, back contact of relay 119 to battery at the normal contact of relay 120. Relay 116 locks over its upper winding through the winding of relay 124 to grounded conductor 114, while relay 118 locks through its lower winding and the winding of relay 119 to ground at the uppermost contact of relay 103. Relay 119 in turn operates relay 117. Relay 117 and 124 together operate relay 120 and provide independent locking circuits for that relay. The operation of relay 120 opens energizing circuits of relays 116 and 118. It also opens the circuits of relay 110 which again extends the ring conductor to the winding of relay 111 so that the next pulse of ringing current causes the operation of relays 111 and 113 as before. With relays 113 and 120 operated, a circuit is closed from grounded conductor 114, lower front contact of relay 113, inner upper front contact of relay 120, brush 202, back contact and winding of magnet 207 to battery, advancing switch 200 to position 2.

In position 2 a circuit is closed from ground over brush 201 through the winding of relay 106 to battery. Relay 106 in turn operates relay 115. With relays 106 and 115 operated, the ring conductor is connected over the inner back contact of relay 105, inner upper front contact of relay 106, resistances 125 and 126, lower front contact and lower winding of relay 116, upper front contact of relay 120, resistance 127 to ground at lower front contact of relay 115.

These resistances are large enough to insure the non-operation of relay 310. The windings of relay 116 are so arranged that as the ringing current approaches the maximum of a negative half cycle relay 116 will be released differentially. With relay 116 released, the ring conductor is extended over the back contact of relay 116 to the upper front contact and upper winding of relay 118, outer lower front contact of relay 117 and the outer upper contact of relay 120 and thence to ground as above traced. As the ringing current approaches the maximum of a positive half cycle, relay 118 releases differentially and a circuit is established for applying a pre-trip test to the trip relay 310. That is, a circuit is established for relay 310 in which the relay should not operate but containing the minimum resistance for that purpose. This circuit may be traced from the ring of jack 101, inner upper back contact of relay 105, inner upper front contact of relay 106, resistances 125 and 126, back contact of relay 116, back contact of relay 118, resistance 129, outer upper front contact of relay 106, uppermost back contacts of relays 105 and 104 to the tip of jack 101. In the meantime, the next closure of the back contact of relay 211 completes a circuit over the lower contact of relay 102, brush 205 in position 2, winding of magnet 207 to battery. When relay 211 opens its back contact the magnet releases and steps switch 200 to position 3. While switch 200 is in position 2, relay 110 is re-operated over brush 204 to discharge condenser 123.

Relay 106 is held operated in position 3 of switch 200. One-half second later when relay 211 again closes its back contact, the circuit above traced is closed over brush 202 to the winding and contact of magnet 207 to step switch 200 to position 4.

In this position relays 106 and 115 are released and a test is made to determine whether tripping relay 310 has operated. The circuit of relay 111 is restored, and, assuming that relay 310 has not operated, ringing current will operate relay 111, in turn operating relay 113. If relay 310 has operated so that ringing current has been cut off, relay 130 is operated over the back contact of relay 111, lower back contact of relay 106, brush 204 to conductor 114. Relay 130 closes a circuit from battery through the winding of relay 104, lower front contact of relay 130, brush 203, to ground at the front contact of relay 211. With the relays 130 and 104 operated a circuit is closed from a source of tone over the upper front contact of relay 130, front contact of relay 104 to the tip conductor and thence over the tip conductor of the trunk to ground at the repeating coil 306 where the tone is repeated over the patching cord and cord circuit 410 to the tester's head set. In position 4 the above traced circuit for relays 116 and 118 is again closed and these relays lock in turn operating relays 117, 119, 120 and 124. With relay 130 not operated, the closure of the front contact of relay 211 completes a circuit over brush 203 and the back contact of relay 130 for magnet 207, advancing switch 200 to position 5.

In position 5, relay 107 is operated over brush 201 and prepares the trip test for relay 310. The circuit of relay 310 extends during this test over inner upper back contacts of relays 105 and 106, inner upper front contact of relay 107, resistance 126 to the armature of relay 116 and from the tip conductor over outer upper back contacts of relays 104, 105 and 106, upper front contact of relay 107 and resistance 129 to the back contact of relay 118. The ring conductor extends first through the winding of relay 116 and then through the winding of relay 118 in the manner previously described and is then extended from the back contact of relay 118 to the back contact of relay 116 to apply the test resistance to relay 310. The release of relays 116 and 118 releases relays 117, 119, 120 and 124 as before. The closure of the front contact of relay 211 with brush 203 in position 5 causes the operation of relay 110 to again discharge condenser 123. A circuit is also closed in this position from battery through resistance 232, winding of relay 131, brush 204 to grounded conductor 114. Relay 131 locks over its upper front contact to conductor 114.

The operation of relay 131 initiates a cycle of operation for relays 222, 223, 225, 227 and 228 under the control of interrupter 212 by way of the back contact of relay 211. The first closure of the back contact of relay 211 completes a circuit from ground over the lower front contact of relay 131, back contact of relay 222, normal contact and winding of relay 223, resistance 224 to battery. Relay 223 locks over its upper front contact to ground over conductor 114 and prepares a circuit for relay 225 from battery through resistance 226, winding of relay 225, upper front contact of relay 223 to conductor 114. Relay 225 is shunted by the operating ground for relay 223 which is connected over the lower back contact of relay 225 to resistance 226. When relay 211 opens its contact relay 225 is permitted to operate and in so doing closes a circuit from ground at its inner upper front contact over the inner upper back contact of relay 228 to the winding of relay 222 and battery. Relay 222 transfers the circuit controlled by relay 211 to the normal contact and winding of relay 227, resistance 229 to battery so that the second closure of the contact of relay 211 operates relay 227 which also locks to conductor 114. A circuit for relay 228 is prepared but relay 228 is shunted in a manner similar to relay 225. The opening of the contact of relay 211 permits relay 228 to operate opening the circuit of relay 222 which now releases. The third closure of the back contact of relay 211 connects ground over the back contact of relay 222, inner lower front contact of relay 225, to resistance 224 in shunt of the winding of relay 223 which releases. Relay 225 is held operated over the normal contact of relay 223 and back contact of relay 221 before the locking circuit of relay 223 is broken. The opening of the contact of relay 211 releases relay 225. A circuit is now closed from ground over the upper contact of relay 228, upper back contact of relay 225, the winding of battery 222 and battery. With relay 222 operated the fourth closure of the back contact of relay 211 connects ground over the lower front contact of relay 228 to resistance 229 shunting and releasing relay 227, relay 228 is held operated over the normal contact of relay 227 and releases when relay 211 opens its back contact. The release of relay 228 also releases 222 and the group of relays is restored to normal. This cycle of operations is continued as long as relay 131 is held operated. One complete cycle requires four closures of the back contact of relay 211 and therefore consumes two seconds while the interval between the operation and release of either relay 223 or relay 227 is one second.

The first closure of the back contact of relay 211, following the operation of relay 131 releases relay 110 and closes a circuit for magnet 207 as well as operating relay 223. The opening of back contact of relay 211 permits magnet 207 to release and advance switch 200 to position 6.

In position 6 relay 107 is released and the circuit of relay 111 re-established to test whether relay 310 has operated. If relay 310 fails to operate, ringing current will again be received to operate relay 111 and in turn relay 113. If relay 113 is operated in position 6 it locks over brush 201 to ground and prevents the advance of the test. If relay 310 has operated, the operation of relay 227 in response to the next closure of the back contact of relay 211 closes a circuit from battery through the winding of magnet 207 and its back contact, brush 202, back contact of relay 113, front contact of relay 227 to ground over the back contact of relay 113 and conductor 114. Magnet 207 steps switch 200 to position 7 in which it prepares to test supervisory relay 315.

When relay 310 operates it opens the shunt around the winding of relay 309, and that relay locks to battery at its front contact. This battery also shunts the winding of relay 308 which releases, disconnecting the ringing machine and ringing keys from the trunk and extending the tip and ring conductors through to repeating coil 306 and battery. Supervisory relay 315 is included in the ring conductor.

With switch 200 in position 7, relay 105 is operated and locked to conductor 114. A circuit is established by relay 105 from battery through the lower left winding of repeating coil 306, winding of relay 315, lower back contact of relay 308, rings of plug 302 and jack 101, inner upper front contact of relay 105, resistances 137, 136, 135, 134, 133, winding of relay 132, outer upper front contact of relay 105, back contact of relay 104, tips of jack 101 and plug 302, front contact of relay 305, upper back contact of relay 308, upper left winding of repeating coil 306 to ground. The resistance in this circuit is such that relay 315 should not operate. Relay 132 operates in the circuit, closing a circuit from battery through the winding of relay 138, front contact of relay 132, brush 204 to grounded conductor 114. With relay 138 operated, a circuit is closed from battery through the winding of magnet 207 and its back contact, brush 202, front contact of relay 138, brush 203, front contact of relay 211 to ground. When relay 211 closes its front contact switch 200 is advanced to position 8, releasing relay 138.

A circuit is now closed from battery, through the winding of relay 139, brush 201 to ground. Relay 139 connects ground over its upper front contact, normal contact of relay 140, normal contact of relay 141 to the circuit of relay 315 between resistances 137 and 136, thus shunting resistances 133 to 136. The current furnished to relay 315 through resistance 137 is sufficient not only to operate that relay but to thoroughly saturate its windings and core with magnetic flux. In the meantime, the opening of the back contact of relay 211 during which switch 200 was advanced to position 8 has permitted relay 228 to operate and to release relay 222. When relay 211 recloses its back contact relay 223 is released and a circuit is closed from grounded conductor 114, back contact of relay 113, back contact of relay 223, brush 202 to the back contact and winding of magnet 207, advancing switch 200 to position 9.

In this position, relay 139 is held operated and the soaking current continued. The release of relay 227 operates magnet 207 to advance switch 200 to position 10.

In position 10 relay 139 is again held operated but relay 141 is operated over brush 204 and the back contact of relay 228 in turn operating relay 140. These relays close a shunt circuit through resistances 142, 143, 144, lower front contact of relay 141, upper front contact of relay 140 to ground at the front contact of relay 211. The current through these resistances is just sufficient to operate relay 315. When relay 211 opens its front contact this shunt is opened and the circuit first traced including the release resistance is restored. During the foregoing operations, therefore, relay 315 has received soaking current for one second, operate current for one quarter of a second and release current for one quarter of a second. At its back contact relay 211 closes the operating circuit for relay 223 which in turn steps switch 200 to position 11.

In this position, relays 139 and 141 are released, but relay 140 is held operated. The shunt circuit for supplying soak current to relay 315 is now closed over the normal contact of relay 141, upper front contact of relay 140 to ground at front contact of relay 211. The same closure of the front contact of relay 211 permits relay 225 to operate. The closure of the back contact of relay 211 restores the release resistance, operates relay 227 and advances switch 200 to position 12.

In position 12 relay 140 is maintained operated and the next closure of the front and back contacts of relay 211 supplies the soak current to relay 315 followed by the release current, and causes the operation of relay 228, the release of relay 223 and the advance of switch 200 to position 13. Two quarter-second pulses of soak current have now been sent to the supervisory relay 315.

In position 13 relay 140 is released and relay 139 re-operated. The closure of the front contact of relay 211 releases relay 225. The closure of the back contact of relay 211 releases relay 227 and advances switch 200 to position 14 without opening the circuit which produces the soak current. The next operation and release of relay 211 release relay 228, operate relay 223 and advance the selector to position 15.

In position 15 the operation of relay 225 in response to the operation of relay 211 closes a circuit for relay 141 which operates relay 140 and again applies the operating current to relay 315 over the front contact of relay 211. The operation of relay 140 in this position causes the release of relay 139. In positions 13, 14 and 15 the supervisory relay 315 is therefore again submitted to a one second pulse of soak current followed by a quarter second pulse of operate current. The release of relay 211 operates relay 227 and advances switch 200 to position 16 while applying the release resistance to relay 315.

The closure of the front contact of relay 211 permits relay 228 to operate while applying operating current to relay 315. The next closure to back contact of relay 211 releases relay 223, applies release resistance to relay 315 and advances the switch to position 17. The next cycle of operations of interrupter 212 causes the release of relays 225 and 227 and the application of operate and release resistance to relay 315. In positions 16 and 17 relay 315 has been submitted to two quarter-second pulses of operate current each followed by two quarter-second pulses of release current. The next closure of the front contact of relay 211 releases relay 228, advances the selector to position 18 and releases relay 141 in turn releasing relay 140. At this time a circuit is closed from ground over brush 201 to resistance 232 in shunt of the winding of relay 131, releasing relay 131. With relay 131 released the circuit of magnet 207 is extended over brush 202 and the back contact of relay 131 to grounded conductor 114 to advance switch 200 to position 19.

In this position relay 104 is operated over brush 201 extending the tip conductor over the back contact of relay 130, resistance 145, to the armature of relay 231. A circuit is also closed from battery through the winding of relay 231, brush 203 to the front contact of relay 211. The intermittent operation of relay 211 causes the corresponding operation of relay 231 and the intermittent connection of battery to the tip conductor produces what is known as the "tick-tock" tone, which informs the tester that the test line 100 has completed its operation.

Each time that relay 315 operates, it closes a shunt around the high resistance winding of relay 307 permitting relay 405 to operate. When relay 405 operates it removes ground from the lower winding of relay 406 and applies it over the normal contact of relay 424 to the upper winding of relay 406, and to the opposite side of condenser 407 from that to which it was formerly connected. This now permits condenser 407 to discharge and recharge in the opposite direction, from battery through the lower winding of relay 406. The current flow through the upper winding of relay 406 is in the direction to operate the relay but it is momentarily delayed by the discharge from condenser 407 and neutralized by the charging current through the lower winding. When this charging current has decreased to a point where the flux through the upper winding overbalances it, relay 406 operates. The constants of the condenser and relay are selected so that the closure of the contact of relay 405 must continue for at least one second to cause the operation of relay 406. Relay 405 also connects ground to the upper winding of relay 413 and the upper terminal of condenser 414, thus charging condenser 414 and magnetizing relay 413 in a direction opposite to that causing the closure of its contact. With relay 406 operated relay 424 is operated over its upper normal contact, front contact of relay 406 to ground at front contact of relay 405. Relay 424 locks over its uppermost contact, back contact of relay 415 to ground at the lower front contact of relay 403. The operation of relay 424 opens the operating circuit of relay 406 thereby releasing relay 406. It will be remembered that the first operation of relay 315 extended over one and one quarter seconds, thus insuring the operation of relay 406 which acts as a gateway to relay 413.

When the pulse ends relay 405 releases connecting ground over its back contact, the front contact of relay 424 to the lower winding of relay 413 and the opposite terminal of condenser 414. Condenser 414 therefore discharges and recharges in the opposite direction. When the charging current falls off sufficiently, relay 413 operates. The constants of condenser 414 and relay 413 are chosen so that this operation requires about .35 seconds for completion which is approximately the time necessary for satisfactory display of the supervisory lamp. A circuit is then closed from ground over the front contact of relay 403, lowermost contact of relay 424, front contact of relay 413, back contact of relay 419, winding of relay 420 to battery. Relay 420 locks through the winding of relay 419, back contact of relay 415, front contact of relay 403 to ground.

The next two pulses of current test the ability of the supervisory relay to release promptly following a heavy current flow. If the relay responds properly it transmits corresponding pulses to relay 405. The operation of relay 405 in response to the first of these pulses discharges and recharges condenser 414 in the opposite direction and releases relay 413. With relay 413 released, relay 419 operates in the locking circuit of relay 420. At the end of this pulse relay 405 releases causing the discharge and charge of condenser 414 and the operation of relay 413, in turn operating relay 418, which locks through the winding of relay 417. The second of these pulses causes a similar set of operations resulting in the operation of relays 417 and 416.

At the beginning of the fourth pulse which, it will be remembered, extended over one and one quarter seconds, the operation of relay 405 causes the release of relay 413 and the operation of relay 415. The operation of relay 415 opens the locking circuit of relays 418 to 420, but relays 415 and 416 remain locked to the lower contact of relay 403. The operation of relay 415 closes a shunt around the winding of relay 404 causing that relay to release and prepare a new locking circuit for relays 417 to 420. Relay 424 is also released and restores the circuit controlled by relay 405 for discharging and recharging condenser 407 and operating relay 406. With relay 406 operated relay 424 is again operated and condenser 414 charged while relay 413 is energized in a non-operative direction. The release of relay 405 at the end of the pulse operates relay 413, in turn operating relay 420 which now locks over the back contact of relay 404 to ground at the front contact of relay 403.

The fifth and sixth pulses test the ability of relay 315 to respond to a minimum current flow. The fifth pulse of current causes relays 419 and 418 to operate while the sixth pulse of current causes relays 417 and 421 to operate. With relay 421 operated a circuit is closed from ground over its front contact, resistance 422, sleeves of jack 412 and plug 411 to lamp 433 indicating to the tester that the testing operations have taken place properly.

If relay 315 fails to either operate or release over the proper length of time the charging and discharging operation of condensers 407 and 414 will not be completed and relays 415 to 421 will not be operated at the time that the tick-tock tone informs the tester that the cycle of tests has been completed. He may then adjust the relay to correct whatever difficulties exist. The position of the relays at the completion of the test indicates whether the relay failed in releasing or in operating.

What is claimed is:

1. In a testing system, a primary testing set, a secondary testing set, means to interconnect a relay circuit therebetween, means in said secondary testing set for causing a relay in said circuit to transmit impulses of variable characteristics, electromagnetic means in said primary testing set responsive only to impulses of a particular character for testing the characteristics of said relay, and a second electromagnetic means in said primary testing set responsive only to impulses of different characteristics for associating said first electromagnetic means with the said relay circuit.

2. In a testing system, a primary testing set, a secondary testing set, means to interconnect a relay circuit therebetween, means in said secondary testing set for causing a relay in said circuit to transmit impulses of variable duration, electromagnetic means in said primary testing set responsive only to impulses of a particular duration for testing the characteristics of said relay, and a second electromagnetic means in said primary testing set responsive only to impulses of different duration for associating said first electromagnetic means with the said relay circuit.

3. In a testing system, a primary testing set, a secondary testing set, means to interconnect a relay circuit therebetween, means in said secondary testing set for operating the relay of said circuit and for varying the duration of holding said relay operated, electromagnetic means in said primary testing set responsive only to an operation of said relay of particularly long duration, means comprising a tuned electromagnet associated with said relay circuit in response to the operation of said electromagnetic means for making a duration test of each operation of said relay, a chain of counting relays operated in response to a series of operations of said tuned electromagnet and means responsive to the operation of the last counting relay to actuate a signal.

4. In a testing system, a trunk circuit having a relay to be tested, a primary testing set, a secondary testing set, means to connect said primary testing set with one end of said trunk, means to connect said secondary testing set with the alternate end of said trunk, means in said secondary testing set for operating the relay of said circuit and for varying the duration of holding said relay operated, electromagnetic means in said primary testing set operably responsive only to an operation of said relay of long duration, means in said secondary testing set for operating said relay at particular intervals and holding said relay operated for particular durations, means comprising a tuned relay and a chain of counting relays associated with said trunk in response to the operation of said electromagnetic means for testing the duration of operation of said relay in response to the relay operating means in said secondary set and means responsive to the operation of the last counting relay for actuating a signal.

5. In a testing system, a primary testing set, a secondary testing set, means to interconnect a relay circuit therebetween, means in said secondary testing set for operating the relay of said circuit and for varying the duration of holding said relay operated, electromagnetic means in said primary testing set responsive only to an operation of said relay of particularly long duration, means comprising a tuned electromagnet associated with said relay circuit in response to the operation of said electromagnetic means for making a duration test of each operation of said relay, a chain of counting relays operated in response to a series of operations of said tuned electromagnet, and means responsive to the satisfactory operation of said relay to cause the simultaneous actuation of signals by said primary testing set and said secondary testing set.

6. In a testing system, a primary testing set, a secondary testing set, means to interconnect a relay circuit therebetween, means in said secondary testing set for operating the relay of said circuit and for varying the duration of holding said relay operated, a tuned electromagnet in said primary testing set responsive only to an operation of said relay of particularly long duration, a second tuned electromagnet responsive only to an operation of said relay of a different duration, said second electromagnet being associated with said relay circuit in response to the operation of said first tuned electromagnet for making a duration test of each operation of said relay, a chain of counting relays operated in response to a series of operations of said second tuned electromagnet, and means responsive with the satisfactory operation of said relay to cause the simultaneous actuation of signals by said primary testing set and said secondary testing set.

7. In a testing system, a primary testing set, a secondary testing set, means to interconnect a relay circuit therebetween, means in said secondary testing set for causing a relay in said circuit to transmit impulses of variable duration, a tuned electromagnet in said primary testing set responsive only to impulses of a particular duration for testing the characteristics of said relay and a second tuned electromagnet in said primary testing set responsive only to impulses of different duration for associating said first tuned electromagnet with the said relay circuit.

8. In a testing system, a link circuit having a relay to be tested, a primary testing set, a secondary testing set, means to connect said primary testing set with one end of said link circuit, means to connect said secondary testing set with the alternate end of said link circuit, means in said secondary testing set for operating the relay of said circuit and for varying the duration of holding said relay operated, electromagnetic means in said primary testing set operably responsive only to an operation of said relay of long duration, means in said secondary testing set for operating said relay at particular intervals and holding said relay operated for particular durations, means comprising a tuned relay and a chain of counting relays associated with said link circuit in response to the operation of said electromagnetic means for testing the duration of operation of said relay in response to the relay operating means in said secondary set and means responsive to the operation of the last counting relay for actuating a signal.

In witness whereof, I hereunto subscribe my name this 4th day of April, 1930.

WALTER KUHN.